Fig. 1

RALPH B. BOWERSOX
CHESTER G. HYLKEMA
INVENTORS

BY Lyon+Lyon
ATTORNEYS

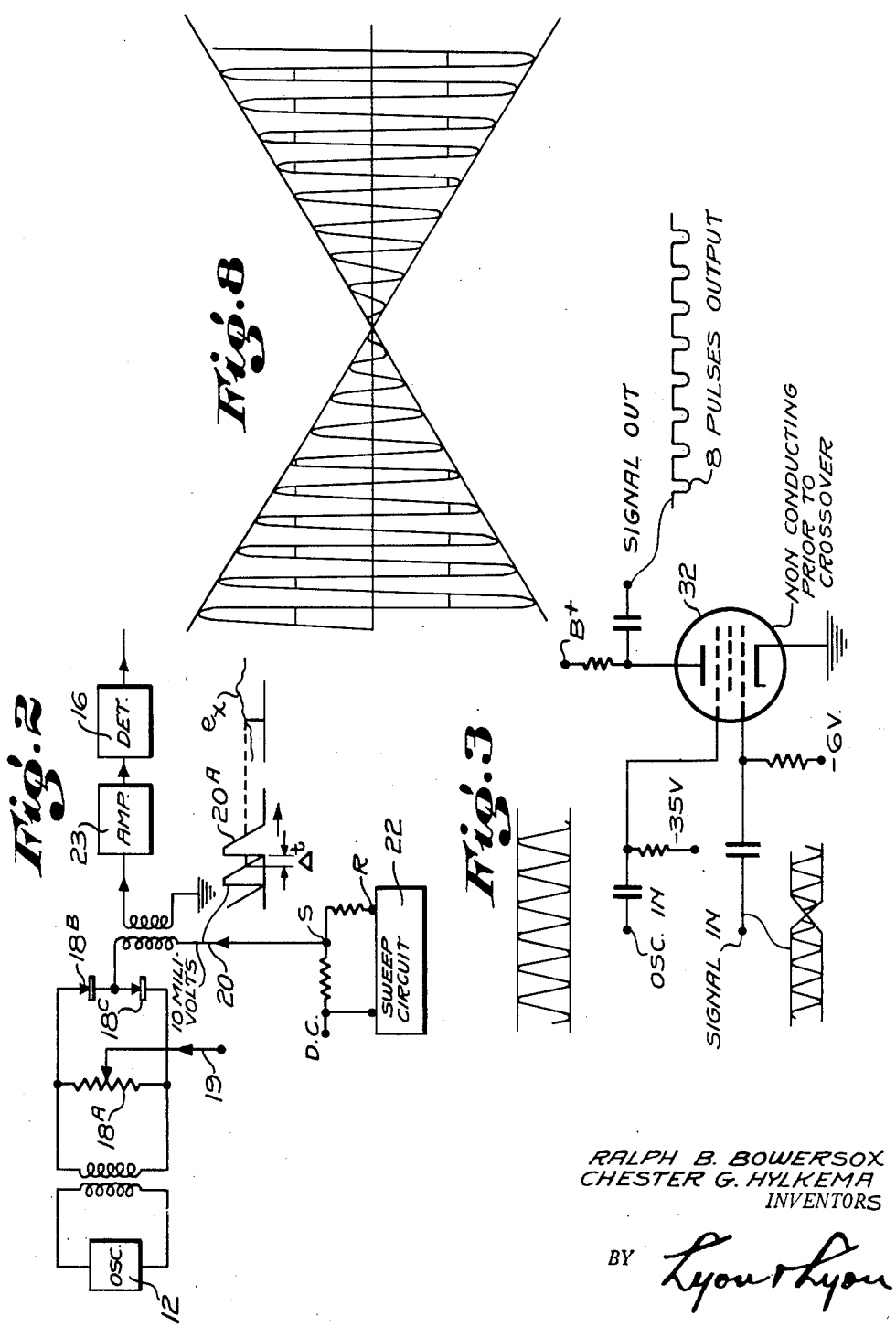

RALPH B. BOWERSOX
CHESTER G. HYLKEMA
INVENTORS

BY Lyon & Lyon

ATTORNEYS

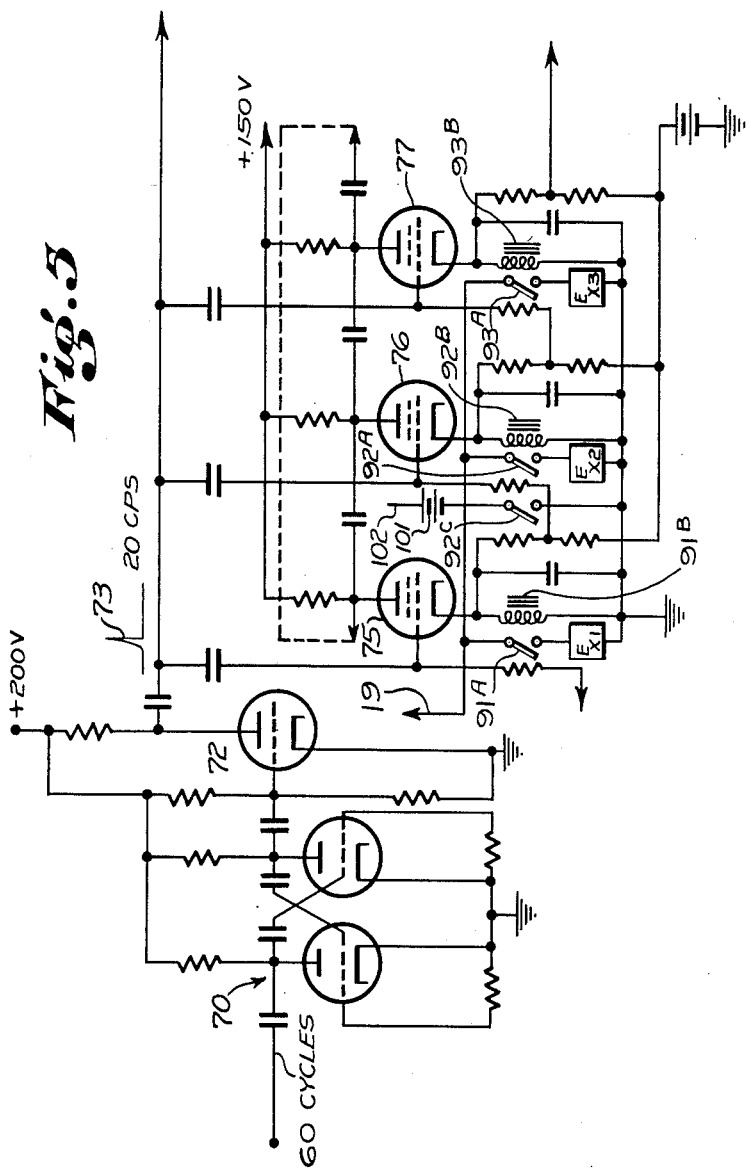

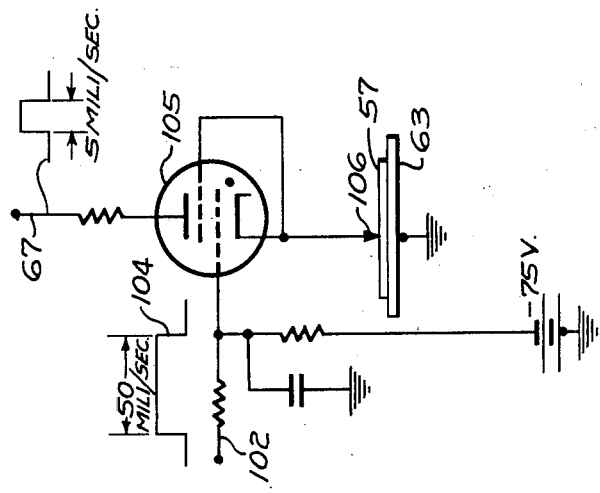
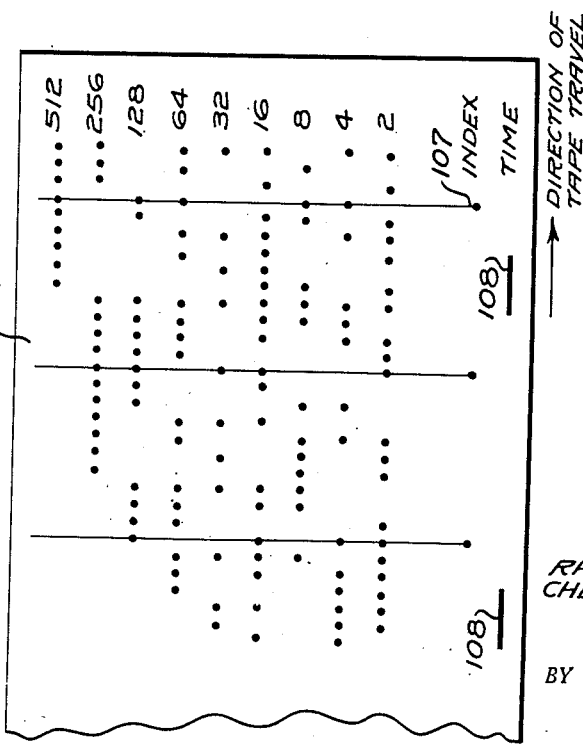

United States Patent Office 2,791,746
Patented May 7, 1957

2,791,746

HIGH SPEED RECORDER

Ralph B. Bowersox and Chester G. Hylkema, La Canada, Calif., assignors to California Institute Research Foundation, Pasadena, Calif., a corporation of California Application October 24, 1952, Serial No. 316,748

2 Claims. (Cl. 324—113)

The present invention relates to means and techniques for measuring and recording electrical characteristics such as voltages and, in particular, to an arrangement whereby, for example, the results of twenty measurements per second are recorded.

The present invention contemplates recording a plurality of measurements during an event which is over in a small period of time. During the flight of a guided missile, for example, it is desirable to record many measurements, it being noted that the time is rather short.

The arrangement described herein is a ten-channel recorder measuring each channel in succession at the rate of twenty measurements a second. The record appears on a 6-inch tape or paper across which the successive measurements are printed. These measurements are delineated in the form of a series of dots representing the numeral 1 or the numeral zero in the respective digits of the binary system.

The standard of comparison for the potentiometer measurement is a repetitive sawtooth voltage having a high degree of linearity and a highly stabilized and standardized slope of voltage versus time. With this standard of comparison, an unknown voltage is accurately converted to a linearly related interval of time, the time intervals lending themselves with relative ease to accurate measurement. An unknown voltage and a sawtooth voltage are compared in a comparator. The comparator detects that instant of time when the variable standard voltage, i. e. the instantaneous value of the sawtooth voltage, is equal to the unknown voltage. The time interval between the point of identity and the end of the sweep serves as a measure of the unknown voltage. The comparator, itself, has many unique features, one of which is that a reversal of phase is used to sense the instant when the sawtooth wave and the unknown voltage are equal.

An object of the present invention therefore is to provide improved means and techniques whereby the above-mentioned results may be produced.

A specific object of the present invention is to provide improved means and techniques whereby the plurality of measurements may be made and recorded in a small fractional part of a second.

Another specific object of the present invention is to provide improved means and techniques whereby the quantity to be measured is first converted into a value representing time, and thereafter the measure of such time serves as an indication as to the value of the quantity.

Another specific object of the present invention is to provide an improved means and technique whereby an unknown quantity, such as a voltage, is compared with a sawtooth wave and a change in phase of the modulated output serves to sense the instant of time when the sawtooth wave and the unknown voltage are of equal magnitude.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows, in block diagram form, a recording system embodying features of the present invention;

Figure 2 represents a simplified schematic drawing of the bridge circuit in the stage designated as "voltage-sensitive bridge comparator" in Figure 1;

Figure 3 shows a schematic diagram of the gate detector which is designated as such in the block diagram in Figure 1;

Figure 5 is a schematic diagram of an input switching circuit which is designated in block diagram form in Figure 1 as a "thyratron switch";

Figure 6 is a schematic diagram showing details of the element designated as "thyratron for channel identification" in Figure 1;

Figure 4:
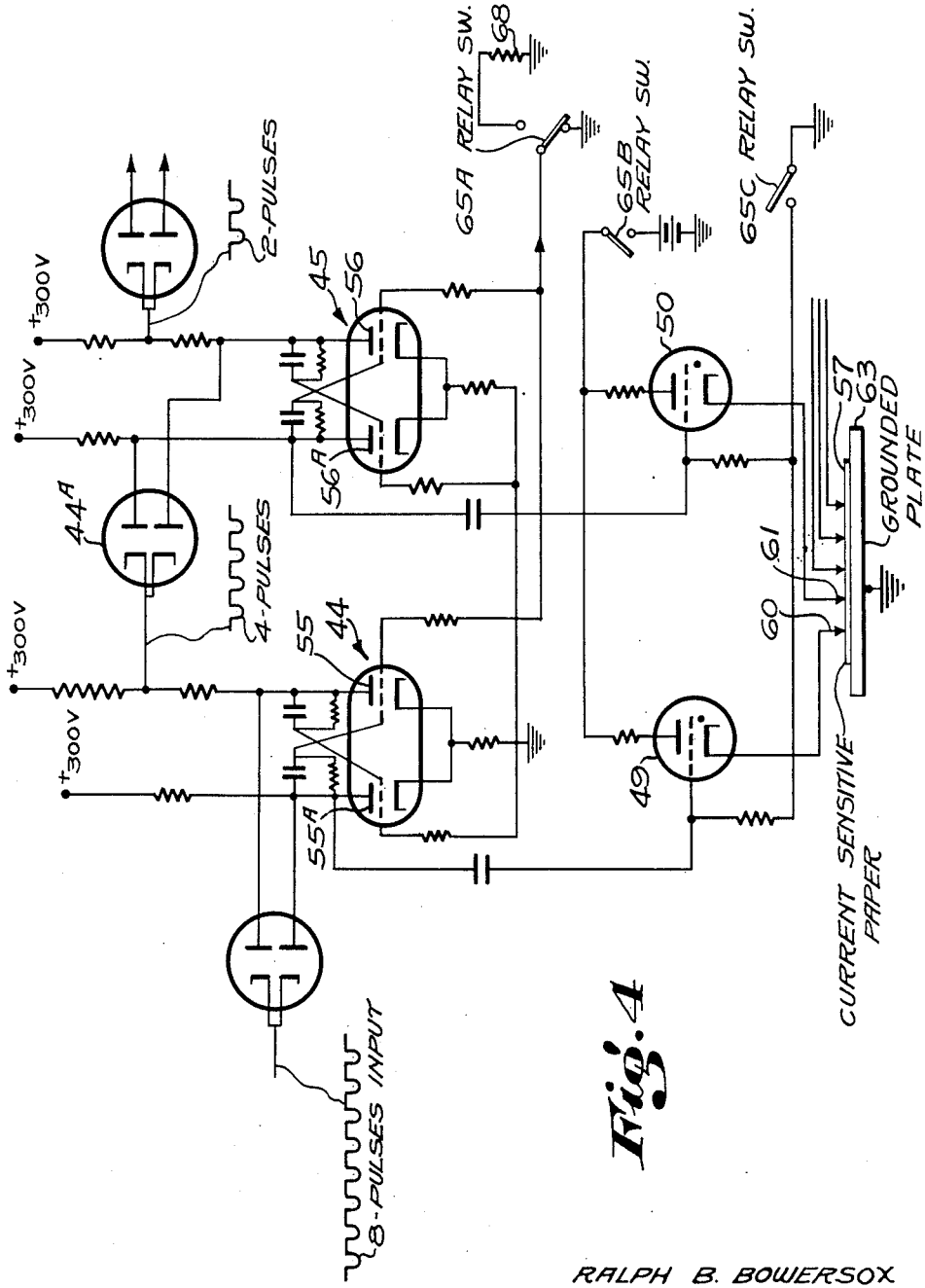
Figure 4 shows a schematic form of two of the counter and thyratron transfer circuits, each of which is designated in Figure 1 as a "binary flip-flop circuit"

Figure 7 serves to illustrate a typical record taken with the apparatus shown in Figure 1; and Figure 8 serves to illustrate the output of the bridge comparator 18 in Figure 1.

The system shown in Figure 1 includes a crystal-controlled oscillator stage 10. The output of stage 10 is applied through coupling diode stage 11 to a subharmonic multivibrator stage 12. The output of the stage 12 constitutes a 27.5 kc. signal. This signal is amplified in the voltage amplifier stage 13 and the output of such stage 13 is applied, on the one hand, to a second amplifier stage 14 and, on the other hand, to the amplier stage 15. The output of the stage 14 is applied to the gate detector stage 16 for purposes described hereinafter, while the output of the amplifier stage 15 is applied to the voltage-sensitive bridge comparator 18.

The comparator 18 embodies important features of the present invention and is illustrated in schematic form in Figure 2.

In general, the comparator stage 18 has applied thereto the aforementioned amplified 27.5 kc. signal, as well as an unknown voltage to be measured appearing on lead 19 and a sawtooth wave appearing on lead 20. The output of the comparator has a wave shape designated by the wave form 21 indicated in Figure 1 and shown in greater detail in Figure 8.

In general, the bridge comparator 18 functions to provide an output wave of minimum amplitude when the intensity of the unknown quantity to be measured is equal to the instantaneous intensity of the rising sawtooth wave applied to such comparator over lead 20. When this condition is achieved, i. e. this condition of equality, the amplitude of the modulated wave is not only of relatively small magnitude, but of greater importance is the fact that the phase of the voltage changes, as illustrated in Figure 7. The sawtooth wave periodically applied to lead 20 is developed in a sweep circuit 22 which is described in detail later. Also, the voltages to be measured are applied to lead 19 in order, by means described later.

The output of the comparator 18 is shaped using the stages 23, 24, 25, 26, and 27. The stage 23 constitutes an amplifier for amplifying that portion of voltage which exists near the phase reversal point. The succeeding stage 24 constitutes a band pass amplifier with degenerative feedback. The stage 25 constitutes another amplifier. The stage 26 which is coupled to the stage 25 constitutes a clipping diode. The output of the clipping diode stage 26 is applied to the amplifier stage 27. The output of the amplifier stage 27 is applied to the clipping diode stage 28 and the output of the stage 28 is applied to the gate detector 16 together with the amplified signal developed in the output circuit of the amplifier stage 14. The circuitry of the gate detector stage 16 is illustrated in Figure 3.

It is noted that the sawtooth wave developed in the sweep circuit 22 and applied over lead 20 of the comparator stage is a standard one of such duration that, in one complete sawtooth sweep, there occur 1000 oscillations of the wave applied from the amplifier stage 15 to the comparator stage 18.

With reference to Figure 2, the bridge comparator 18 includes a tapped resistance 18A connected in shunt with the crystal diodes 18B and 18C. As seen in Figure 2, the standard negative going sweep voltage 20A appearing on lead 20 and the unknown voltage 19A appearing on lead 19 are effectively subtracted in series and this net voltage is applied across the bridge. When the difference voltage is not zero, one crystal becomes more conductive than the other and the bridge is unbalanced. As the polarity of the difference voltage changes, the bridge output also changes phase, as illustrated in connection with Figure 7. The output voltage is transformer-coupled to the input of the amplifier stage 23 and subsequently to the detector stage 16.

The linear sweep wave 20A, i. e. the reference voltage, is developed in a conventioned phantastron sweep circuit 22. This sweep has a linear wave form which starts at a level of about +120 volts at the point R, goes negatively to zero level, then returns quickly to the level of +120 volts and awaits the next trigger pulse. At a point S the maximum voltage is 10 millivolts.

The gate detector 16 (Figures 1 and 3) is a dual control grid tube. The amplified oscillator signal appearing at the output of the amplifier stage 14 is coupled to the suppressor grid, and the output of the clipper diode stage 28 is coupled to the main control grid. Prior to the cross-over point of the signal applied from the stage 28, the two signals as shown in Figure 3 are in phase opposition, whereas subsequent to the cross-over, the signals are in phase, and a pulse is developed at the anode of tube 32 for each full period of the 27.5 kc. per second signal. It is remembered that the 27.5 kc. signal provides a maximum of 1000 occurrences in one sweep of voltage wave 20A. It is assumed that, in this instance, the unknown voltage is of such value that there are eight cycles of the 27.5 kc. signal after the cross-over point. Thus, as indicated in Figure 3, there are eight pulses developed on the anode of tube 32. Subsequent circuitry described hereinafter serves to count accurately the number of pulses developed on the anode of tube 32. However, before counting is accomplished, such pulses appearing on the anode are shaped and clipped so that uniform pulses are applied to the counter. For this purpose, as illustrated in Figure 1, the output of the gate detector is applied to the pulse shaping network 40 and 41 in succession and then applied to the binary flip-flop counter 43 through the coupling diode stage 42. As is conventional, there are a plurality of such flip-flop counters and these are designated in Figure 1 as 43, 44, and 45, the counter 43 being connected to the counter 44 through the coupling diode 43A, and the counter 44 being connected to the counter 45 through the coupling diode 44A. There are, in fact, ten of such binary counters, as indicated in Figure 1, each connected through a coupling diode in the like manner as described above and as indicated by the block 48 in Figure 1. The output of each one of such counters, with the exception of counter 43, is applied to a corresponding recording circuit 49, 50, and 51, the output of the counter 44 being applied to the recording circuitry 49, the output of the counter 45 being applied to the recording circuitry 50, and the output of the seven counters included in the block diagram 48 being applied to the corresponding one of seven identical recording units included in the block 51. A typical one of such combination counter and recording circuits is illustrated in Figure 4, and Figure 4 includes the circuitry of the elements 44 and 49 in Figure 1.

Referring to Figure 4, the circuitry includes twin triode tubes 55 and 56 in a binary counting arrangement. Coupling between successive stages is accomplished by means of the twin triodes as indicated. Transfer of the count existing in the ten-stage counter at the end of each sweep to the current-sensitive paper 57 in the recorder is performed by thyratrons 49 and 50 coupled respectively to the anodes 55A and 56A. The styli 60, 61 connected to the cathodes of tubes 49 and 50, respectively, contact one side of the paper 57, the other side of the paper 57 being in contact with grounded plate 63. The recording of the counts takes place at the end of each sweep at the instant of resetting the counter stages. For that purpose, reset pulses are applied over lead 64 (Figure 1) to each of the counters from the pulse relay 65. The relay 65 is energized for only 5 milliseconds in the manner described hereinafter and, in addition to controlling the transmission of the reset pulse to lead 64, serves two other functions, namely, first, a contact of the relay 65 is connected to the lead 66 to provide a ground for the grid return of the recording thyratrons 49, 50, as indicated in Figure 4 and, second, a contact of the relay 65 serves to control the transmission of a 5 millisecond trigger pulse serves as the anode voltage for the thyratron tubes 49, 50, as shown in Figure 4. Actually, as also shown in Figure 4, the lead 64 indicated in Figure 1 is disconnected from ground and connected to one terminal of the resistance 68 in Figure 4, the other terminal of resistance 68 being grounded. As mentioned previously, the recording of the counts takes place at the end of each sweep at the instant of resetting the counter stages. The relay 65 performs, as mentioned previously, the reset function first by reducing the grid bias on all the thyratron transfer tubes and then resets those counter stages which have not been left in the zero stage at the end of each sweep. The action of resetting a counter pair generates a positive pulse which fires the corresponding thyratron and makes a mark on the current-sensitive recording paper by passing an electric current through the paper. The duration of this current is limited by using the aforementioned relay 65 which is energized for only 5 milliseconds. The relay 65 is preferably a mercury relay.

*Circuitry for developing standard sawtooth wave 20A and for applying unknown voltages to comparator 18 with reference to Figures 1 and 5*

As mentioned previously, the standard sawtooth voltage wave is applied to lead 20 in Figure 1 and the unknown voltages are applied sequentially to lead 19. Such sawtooth voltage wave is operated in timed relationship with 20 cycle per second pulses developed in the stage 70 (Figures 1 and 5) which is synchronized with the commercially available 60 cycle power supply line. The stage 70 includes a multivibrator including circuitry for differentiating the 20 cycle per second vibrations and for suppressing partially the negative pulses of the 20 cycle wave. These negative pulses are applied to the trigger amplifier tube 72 which serves to remove the positive pulses and to invert the negative pulses so that positive triggers of the character illustrated at 73 are developed at the anode of tube 72. These positive pulses 73 are applied, on the one hand, to ten thyratron switch tubes 75, 76, and 77–84, connected in conventional manner in a ring so that at any one particular time only one of such tubes is in a fired condition, and such that the tubes are successively fired in accordance with each positive pulse 73; and, on the other hand, such positive pulses 73 are applied to the trigger delay and amplifier stage 85 to develop amplified pulses. The stage 85 includes a conventional delay network for delaying the train of triggers 73 for approximately 4 milliseconds. Such delay networks are conventional and the specific one used for that purpose is not described in detail. The delayed and amplified pulses 86 are applied to the amplifier stage 87 to develop positive pulses which, in turn, are applied to the phantastron sweep circuit 22 serving to develop standard sawtooth voltage waves 20A in timed relationship with the pulses or triggers 88. The sweep voltages developed in stage 22 are applied not only to the lead 20 but are also connected to the trigger and reset pulse amplifier 89 through a differentiating network 90. The output of the amplifier 89 is used to actuate the mercury relay 65 which has the switches 65A, 65B, and 65C, illustrated in Figure 4, for purposes mentioned hereinabove, namely, to provide resetting of the counters and to energize suitable elements in the recorder.

As indicated in Figures 1 and 5, the ten unknown voltages, $EX_1$–$EX_{10}$, are applied through relays 91–100 in succession to the common lead 19. The coils of the relays are characterized by the letter "B" appended to the reference numerals, whereas the switch operated by the corresponding relay is characterized by the letter "A" appended to the reference numeral; for example, the relay 91 has the solenoid 91B and associated switch 91A. The relays 91–100 are operated by the aforementioned thyratrons 75–84, respectively. Only one of the ten thyratrons is conducting, and this conducting state is made to pass from one tube to the next by applying sharp positive pulses to all the grids in parallel at the rate of twenty pulses per second.

For purposes of identification, the second thyratron switch 76, which corresponds to channel 2, is provided with an additional relay switch 92C in series with a voltage source 101 (Figure 5) and lead 102 (Figures 1 and 5) to effect a recording at the time when the voltage of channel 2 is being measured. Pulse 104 thus appears on lead 102 and is applied to the thyratron circuitry 103 indicated in Figure 1 and illustrated in Figure 6. Referring to Figure 6, the positive pulse 104 of 50 milliseconds duration is applied to the control grid of the thyratron tube 105 which has its anode connected to the lead 67 to which a 5 millisecond voltage pulse is applied. At coincidence of these two pulses, i. e. the pulses 67 and 104, the thyratron tube 105 is fired and current passes through the stylus 106, paper 57, and the grounded plate 63 to thus provide a marking on the tape for purposes of identifying the different markings. This recording is indicated as the mark 107 in Figure 7. The record in Figure 7 may also include markings 108 of predetermined length for time correlation. Thus, referring to Figure 7, the first reading of the voltage in channel 2 would correspond to 4, 8, 64, 128, 512. The second voltage reading in channel 2 would correspond to 2, 16, 32, 128, 256. The third reading of the voltage in channel 2 would correspond to 2, 4, 16, and 128. The second reading in channel 2 would succeed the first reading by one-half second, and the third reading would succeed the second reading by one-half second, since, as mentioned previously, there are twenty measurements made per second.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a source of negative going sawtooth waves, a source of unknown voltage, a comparator, a source of oscillating voltage applied to said comparator, said comparator incorporating means for effectively changing the phase of said oscillating voltage when the magnitude of said unknown voltage is equal to the instantaneous magnitude of said sawtooth voltage, detecting means coupled to said comparator for detecting said change in phase and for passing a predetermined number of cycles of said oscillating voltage only after said change in phase occurs, counting means for counting said predetermined number of cycles, and utilization means coupled to said counting means.

2. In an arrangement of the character described, a source of negative going sawtooth voltages, a source of unknown voltage, a voltage-sensitive bridge comparator coupled to each of said sources, a source of oscillatory voltage coupled to said comparator, said comparator incorporating means for comparing the instantaneous magnitude of said unknown voltage with the instantaneous magnitude of sawtooth voltage and for effectively changing the phase of said oscillating voltage at the instant the magnitude of said unknown voltage is equal to the instantaneous magnitude of said sawtooth voltage, detecting means coupled to said comparator for detecting said change in phase and for producing an electrical quantity representative of the number of cycles of said oscillating voltage which occurs after said change in phase, counting means coupled to said detecting means, and recording means coupled to said counting means for recording said electrical quantity.

References Cited in the file of this patent

UNITED STATES PATENTS

| | | |
|---|---|---|
| 2,544,740 | Varela | Mar. 13, 1951 |
| 2,560,256 | Shrader | July 10, 1951 |
| 2,678,254 | Schenck | May 11, 1954 |